United States Patent [19]

Nanba

[11] Patent Number: 4,665,484

[45] Date of Patent: May 12, 1987

[54] SHARED MEMORY MULTIPROCESSING SYSTEM & METHOD

[75] Inventor: Shinji Nanba, Tokyo, Japan

[73] Assignee: NEC Corporation, Tokyo, Japan

[21] Appl. No.: 671,363

[22] Filed: Nov. 14, 1984

[30] Foreign Application Priority Data

Nov. 15, 1983 [JP] Japan .................................. 58-214534

[51] Int. Cl.[4] .............................................. G06F 15/16
[52] U.S. Cl. .................................................... 364/200
[58] Field of Search ......................... 364/200 MS File

[56] References Cited

U.S. PATENT DOCUMENTS 3,896,418  7/1975  Brown ................................. 364/200

Primary Examiner—Raulfe B. Zache
Attorney, Agent, or Firm—Schwartz, Jeffery, Schwaab, Mack, Blumenthal & Evans

[57] ABSTRACT

When a first program executed on a first processor of a plurality of processors of a multiprocessing system intends to lock a given shared resource of a main memory in order to use same, if the desired resource is in use by a second program executed on a second processor, the first processor awaits an unlock signal which indicates that one of the shared resources is released for use. The first processor responds to the unlock signal and checks whether or not the desired resource is available. If not available, the first program again awaits the reception of the unlock signal, while if available, the first program accesses the desired resource to use same.

2 Claims, 4 Drawing Figures

SHARED MEMORY MULTIPROCESSING SYSTEM & METHOD

BACKGROUND OF THE INVENTION

1. Field of The Invention

The present invention relates to a method of controlling multiprocessing system in which a main memory is shared in common by a plurality of programs concurrently executed on a plurality of processors, and more specifically to such a method for controlling sharing of one or more common resources of the main memory. The present invention also relates to a hardware arrangement for accomplising the above-mentioned method.

2. Description of the Prior Art

A multiprocessing system carries out more than one program at the same time. It has been known in such a system to use a so-called TEST AND SET instruction in order to control sharing of a common resource (viz., a common storage area) of the main memory by more than one program. The operand of the TEST AND SET instruction is a data which indicates whether or not a corresponding shared resource is locked. For the sake of convenience, the operand of the TEST AND SET instruction will be referred to as the TS instruction, while the operand of the TS instruction will be referred to as a GATE. It should be noted that each shared resource has its own GATE. The first bit (the leftmost bit) of the GATE is used as a control bit. If the control bit is a logic "1", a control code is set to a logic "1" which indicates that the shared resource is locked (viz., not available for use because a program executed on one processor is now in use). On the other hand, if the control bit is a logic "0", the control code is set to a logic "0" which indicates that the shared resource is unlocked (viz., available for use).

The TS instruction has been described in a manual published by IBM, entitled "IBM System/370 Principles of Operation" (GA22-7000-7, File No. S370-01).

In order to make clear the advantage of the present invention over the prior art, reference will be made to FIG. 1 which is a flowchart showing how the sharing of the common resource is controlled utilizing the TS instruction according to the prior art.

In FIG. 1, one of the plurality of processors obtains a right to use a common bus (step 10) in order to access the shared resource of the main memory. The processor reads out the GATE (step 12) from the main memory, after calculating or determining the address of the GATE. The processor checks whether the first bit of the GATE is a logic "1" (step 14). If the first bit of the GATE is a logic "1", the program goes to step 16 in which a condition code (abreviated CC in FIG. 1) is set to a logic "1", and if a logic "0", the condition code is set to a logic "0" at step 18. Thereafter, the entire GATE is set to all "1"s (step 20), and the processor abandons the right to use the common bus (step 22). The above-mentioned steps 10 through 22 constitute the TS instruction which is enclosed by a broken line. No access by another processor is permitted to the GATE between the moment of fetching and the moment of storing all "1"s. It should be noted that each processor is provided with a register for storing the condition code.

Subsequently, the processor checks whether the condition code is a logic "0" (step 24). If the condition code is a logic "1", the program recycles to step 10 and repeats the aforesaid steps until the condition code is detected to be a logic "0" at step 24. Contrarily, if the condition code is determined to be a logic "0" at step 24, the program goes to step 26 in which the program executed on the processor in question accesses the shared resource and executes a predetermined operation(s). Thereafter, the GATE is set to all "0"s at step 28 in order to unlock or free the shared resource.

The above discussion shows that if a first program executed on a first processor intends to use the shared resource while a second program executed on a second processor has taken a priority of use of the same, the first program has to repeat the TS instruction until the second program unlocks the resource. As shown in FIG. 1, the TS instruction includes two accesses to the main memory: (a) the readout of the GATE and (b) the writing of all "1"s to the entire GATE. Using the main memory (viz., using the common bus) by the second processor during the TS instruction, prevents other processors from accessing the main memory, and hence the repeating of the TS instructions causes the access of the other processor to the main memory to be delayed. This means that the second processor is delayed in unlocking the shared resource. Consequently, the overall system efficiency is lowered by the repeating of the TS instruction.

In order to solve the above difficulties, two methods may be considered. Viz., if the condition code is determined to be a logic "1", (a) the program sets a timer and thence becomes free from the control of the processor, and thereafter again being executed by the processor upon the expiration of a predetermined time interval and processing the TS instruction or (b) a predetermined number of no-operation instructions are repeated. However, the first method (a) makes a so-called overhead large due to the program switching. Whilst, the second method (b) does not contribute to the increase of the system execution speed in that each no-operation instruction should be read out from the main memory.

SUMMARY OF THE INVENTION

The object of the present invention is to provide a method of controlling multiprocessing system by which the aforesaid difficulties of the prior art are overcome.

Another object of the present invention is to provide a method of controlling a multiprocessing system by which the execution speed is increased as compared with the prior art when a commonly shared resource(s) is to be used by more than two programs executed on more than two processors within same time period.

Another object of the present invention is to provide a hardware arrangement for controlling multiprocessing system by which the aforesaid difficulties of the prior art are overcome.

Yet another object of the present invention is to provide a hardware arrangement for controlling multiprocessing system by which the execution speed is increased as compared with the prior art when a commonly shared resource(s) is to be used by more than two programs executed by more than two processors within same time period.

First aspect of the present invention takes the form of a method of controlling a multiprocessing system wherein a plurality of programs are processed simultaneously by two or more processors which share in common a main memory, and wherein the processors lock a shared resource within the main memory by the steps of: (a) obtaining a right to use a common bus; (b) fetching the operand of the lock instruction; (c) determining whether the operand satisfies a first predetermined condition; (d) abandoning the right to use the common bus if the operand does not satisfy the first predetermined condition, and waiting until one of the processors produces an unlock signal; (e) repeating the steps (a) through (c) if the unlock signal is produced; (f) writing a first predetermined code into the operand if the operand satisfies the first predetermined condition; and (g) abandoning the right to use the common bus; and wherein the processors unlock the shared resource by the steps of: (h) obtaining the right to use the common bus; (i) writing a second predetermined code into the operand; (j) producing the unlock signal; and (k) abandoning the right to use the common bus.

Another aspect of the present invention takes the form of a hardware arrangement for controlling a multiprocessing system wherein a plurality of programs are processed simultaneously by two or more processors which share in common a main memory, and wherein the processors lock a shared resource within the main memory, the hardware arrangement comprising: an OR gate which has a plurality of input terminals coupled to an output terminal of each of the processors, and which has an output terminal coupled to an input terminal of each of the processors, the OR gate being supplied with an unlock signal which one of the processors produces when unlocking the shared resource.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 1:
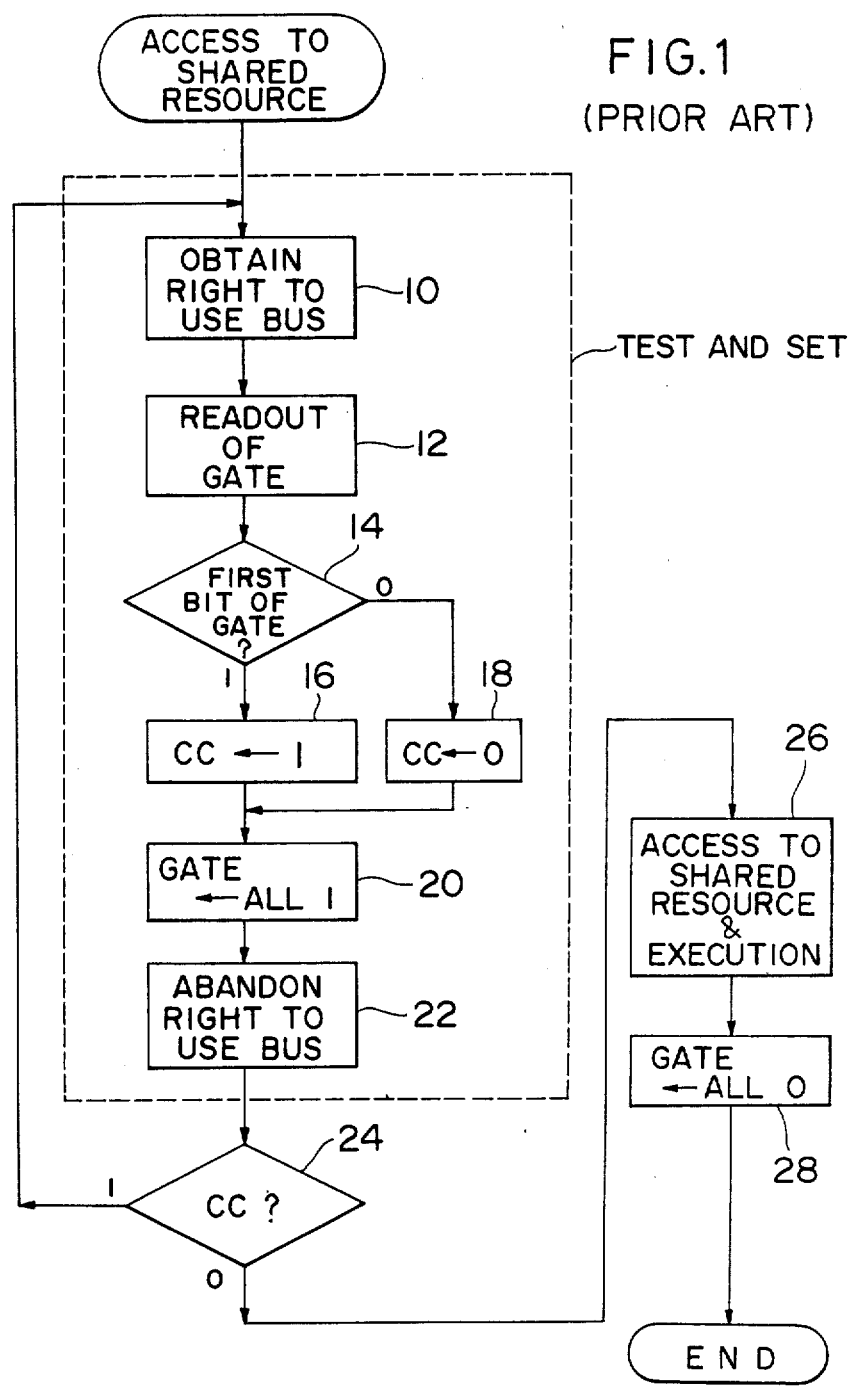
FIG. 1 is a flowchart showing an instruction loop including the TS instruction referred to in the opening paragraphs of the present disclosure.
Figure 2:
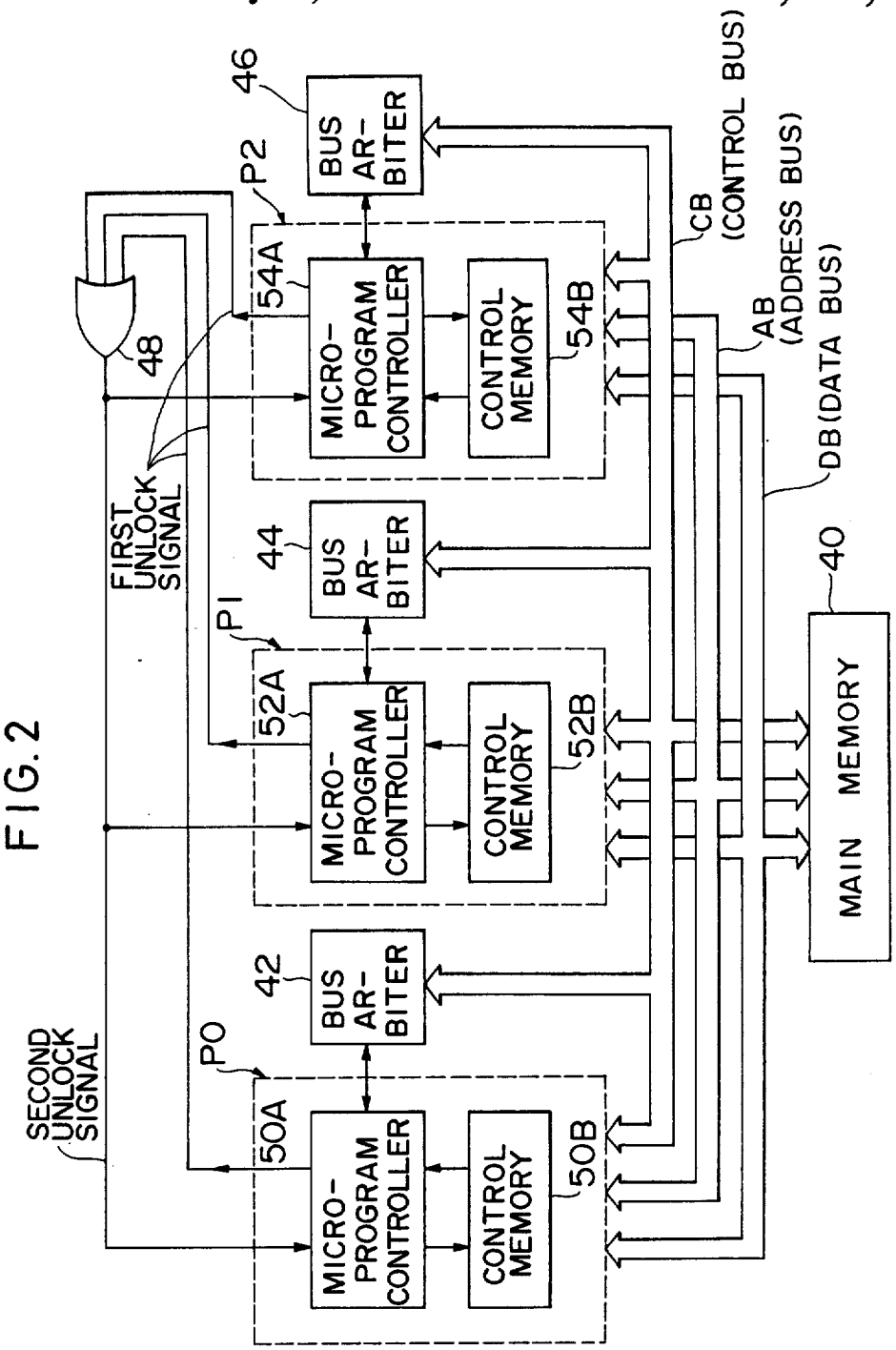
FIG. 2 is a block diagram showing a hardware arrangement according to an embodiment of the present invention.

Referring now to FIG. 2, there is shown in block diagram form one example of an arrangement according to the present invention. The arrangement shown in FIG. 2 comprises a plurality of processors P0, P1 and P2, a main memory 40, bus arbiters 42, 44 and 46, an OR gate 48, an address bus AB, a control bus CB, and a data bus DB. The main memory 40 is shared in common by the processors P0, P1 and P2 via the three buses AB, CB and DB, while the bus arbiters 42, 44 and 46 are provided for operating in unison and resolving competing requests for access to the common buses by the processors.

Each of the bus arbiters 42, 44 and 46 is of a known type which, for example, has been disclosed in U.S. Pat. No. 4,375,639. Further, each of the processors P0, P1 and P2 is able to use a conventional type processor which has been disclosed in U.S. Pat. No. 4,080,648 by way of example. Therefore, the detailed descriptions thereof will be omitted.

The processor P0 includes a microprogram controller 50A and a control memory 50B, and is controlled by a plurality of microinstructions previously stored in the control memory 50B. More specifically, the microprogram controller 50A applies an address signal to the control memory 50B in order to derive a corresponding microinstruction from a desired microinstruction. The microprogram controller 50A receives the microinstruction thus derived by which the controller 50A processes a desired operation. Each of the other processors P1 and P2 is of an arrangement identical to the processor P0, and includes a microprogram controller (52A or 54A) and a control memory (52B or 54B). The operation of such a processor is known in the art and is not directly concerned with the present invention, and hence further discussions thereof will be omitted for clarity.

As shown, the processors P0, P1 and P2 are coupled to the input terminals of the OR gate 48 which has an output terminal coupled to the processors P0, P1 and P2. Each of the processors P0, P1 and P2 applies an unlock signal (a first unlock signal), when a corresponding program unlocks a shared resource after locking same and obtaining access thereto. Consequently, the processors P0, P1 and P2 are informed if a shared resource is unlocked by one of the controllers through the monitoring of the output (a second unlock signal) of the OR gate 48. It will be understood that the second unlock signal indicates only that a program executed on a certain processor has unlocked an specified shared resource. The specification of the processor, which has produces the first unlock signal, will be discussed with reference to FIG. 3. The provision of the OR gate 48 is directly concerned with the present invention. The instructions of the locking and unlocking according to the present invention will be described in detail with reference to FIGS. 3 and 4, respectively.

Figure 3:
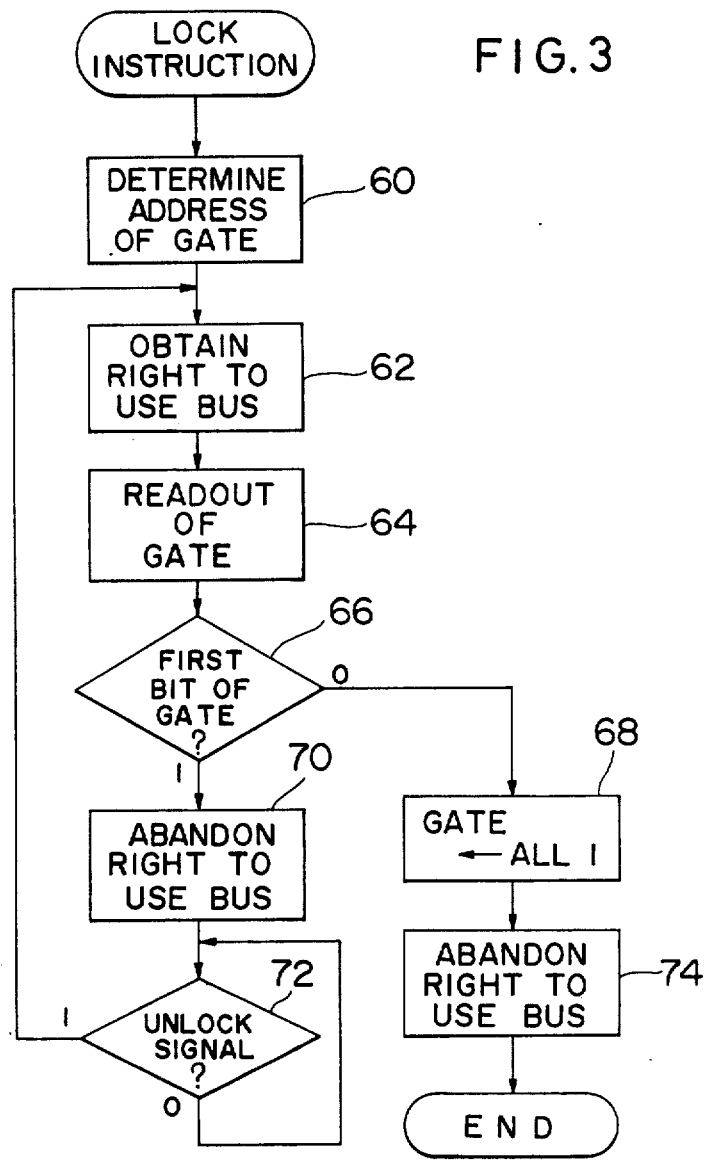
FIG. 3 is a flowchart showing a lock instruction according to the present invention.

FIG. 3 is a flowchart showing a series of lock instruction steps. It is assumed that a program executed on the processor P0 intends to use a shared resource and hence is going to lock same for the exclusive use thereof. First, the processor P0 determines or calculates the address of the operand (GATE) of the lock instruction at step 60. Thereafter, the microprogram controller 50A (FIG. 2) issues a request for use of the common buses to the bus arbiter 42, and waits until such a request is permitted thereby (step 62). If the request for use of the common buses is allowed (viz., if the processor P0 can access the main memory 40), then the processor P0 applies the determined address of the GATE to the main memory 40 via the address bus AB and concurrently appplies a readout command to the main memory 40 via the control bus CB, thereby fetching the content of the GATE (step 64) through the data bus DB. Thereafter, the processor P0 checks the first bit of the GATE (step 66). If the first bit is a logic "0", the microprogram goes to step 68. Otherwise (viz., in the case of a logic "1"), the program goes to step 70. It should be noted that the logics "0" and "1" indicate the unlocked and locked conditions of the shared resource in question, respectively.

At step 68, the processor P0 applies the address signal indicative of the GATE address via the address bus AB, while applying the data having all bits "1"s to the entire GATE via the data bus DB and also applying a write command signal to the memory via the control bus CB. Therefore, the content of the GATE is filled with bits "1"s at step 68. After completion of the writing of all bits "1"s, the processor P0 issues a signal to the bus arbiter 42 in order to abandon the right to use the common buses (step 74). The reason that the all logic "1"s are stored in the entire GATE at step 68, is to prevent the other processors from accessing the shared resource which the processor P0 intends to use.

On the other hand, if the GATE has a logic "1" at the first bit thereof, the processor P0 abandons the right to use the common buses through the bus arbiter 42 (step 70) and awaits the reception of a logic "1" (viz., the second unlock signal in FIG. 2) from the OR gate 48 (step 72). When the signal of logic "1" is applied to the microprograming controller 50A from the OR gate 48, the microprogram goes back to step 62, wherein the microprogram controller 50A requests the bus arbiter 42 for exclusive use of the common buses, as previously mentioned.

Thereafter, the first bit of the GATE is checked wether it is a logic "1" or not at step 66. If the first bit of the GATE is a logic "0", then the program goes to step 68, while if a logic "1", step 70 is carried out. As mentioned previously, even if the OR gate 48 produces the second unlock signal, it is impossible to determine which shared resource is unlocked among a plurality of resources. This is the reason that the first bit of the GATE is again checked at step 66 after the unlock signal is detected at step 72.

As shown in FIG. 3, when the first bit of the GATE is detected to be a logic "1", the processor P0 abandons the right to use the common buses and thence waits until the (second) unlock signal is outputted from the OR gate 48. This means that the processor P0 uses the common buses only when there exists a possibility that a shared resource can be used.

Figure 4:
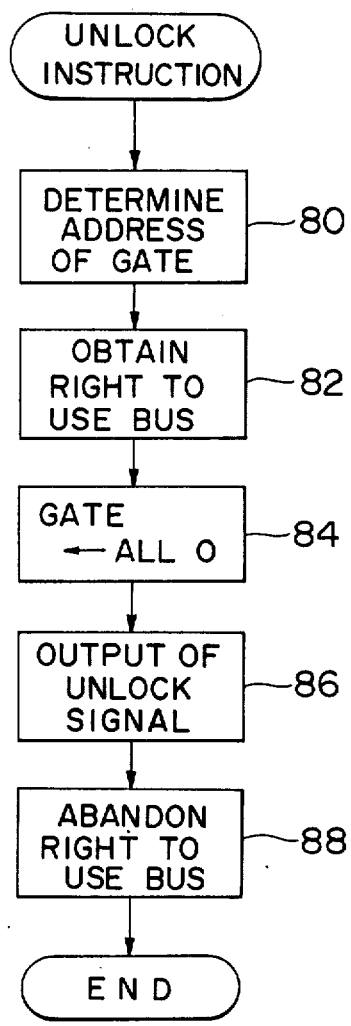
FIG. 4 is a flowchart showing a unlock instruction according to the present invention.

FIG. 4 is a flowchart showing the unlock instruction according to the present invention. It is assumed in FIG. 4 that the processor P0 has already used the shared resource and is going to free same. In FIG. 4, the processor P0 determines the address of the GATE (step 80), and obtains the right to use the common buses through the bus arbiter 42 (step 82). Thereafter, the processor P0 writes all logic "0" into the GATE in order to unlock the shared resource (step 84), and produces a first unlock signal (step 86) which is applied to the OR gate 48, and finally abandons the right to use the common buses (step 88).

If other processor P1 intends to use the same shared resource as the processor P0 has used, and if the processor P1 awaits the reception of the unlock signal from the OR gate 48, then the microprogram exectued on the processor P1 breaks out of the loop shown at step 72 in response to the issuance of the unlock signal from the processor P0.

In the above discussions, if the two processors P0 and P1 intend to use the same shared resource, and if the two processors P0 and P1 await the reception of the unlock signal from the OR gate 48, one of the processors which first obtains the right to use the common buses at step 62 (FIG. 3) can use the shared resource.

In the hardware arrangement shown in FIG. 2, a plurality of bus arbiters is utilized in order to control the competing use of the common buses, but not limited thereto. For example, in a multiprocessing system having no common buses, each bank of a main memory is controlled for exclusive use by each processor. Further, the OR gate 48 can be replaced by a wired-or gate. Still further, the microprogram control can be substituted by a programmable logic array, etc.

The foregoing description shows only preferred embodiments of the present invention. Various modifications are apparent to those skilled in the art without departing from the scope of the present invention which is only limited by the appended claims.

What is claimed is:

1. A hardware arrangement for controlling a multiprocessing system wherein a plurality of programs are processed simultaneously by two or more processors which share in common a main memory, and wherein said processors lock a shared resource within said main memory, said hardware arrangement comprising:
    a means for performing a logical OR, said means having a plurality of input terminals coupled to an output terminal of each of the processors and having an output terminal coupled to an input terminal of each of the processors,
    said means for performing a logical OR being supplied with an unlock signal which one of the processors produces when unlocking the shared resource.

2. A method of controlling a multiprocessing system wherein a plurality of programs are processed simultaneously by two or more processors which share in common a main memory, and wherein said processors lock a shared resource within said main memory by the steps of:
    (a) obtaining a right to use a common bus;
    (b) fetching the operand of a lock instruction;
    (c) determining whether the operand satisfies a first predetermined condition;
    (d) abandoning the right to use the common bus if the operand does not satisfy said first predetermined condition, and waiting until one of the processors produces an unlock signal;
    (e) repeating the steps (a) through (c) if the unlock signal is produced;
    (f) writing a first predetermined code into said operand if said operand satisfies said first predetermined condition; and
    (g) abandoning the right to use the common bus; and wherein said processors unlock the shared resource by the steps of:
    (h) obtaining the right to use the common bus;
    (i) writing a second predetermined code into said operand;
    (j) producing the unlock signal; and
    (k) abandoning the right to use the common bus.

* * * * *